United States Patent [19]

White et al.

[11] Patent Number: 4,775,816

[45] Date of Patent: Oct. 4, 1988

[54] PIEZOELECTRIC SENSOR

[75] Inventors: Christopher White, Tolland; Michael A. Virello, Bristol, both of Conn.; Edward Yelke, LaGrange, Ill.; John R. Huff, South Windsor, Conn.

[73] Assignee: Stanadyne, Inc., Windsor, Conn.

[21] Appl. No.: 118,446

[22] Filed: Nov. 9, 1987

[51] Int. Cl.⁴ .................. H01L 41/08; G01L 9/06
[52] U.S. Cl. .................. 310/338; 73/119 A; 73/730
[58] Field of Search .......... 310/334, 338, 339, 328; 73/730, 119 A, DIG. 4

[56] References Cited

U.S. PATENT DOCUMENTS

| | | | |
|---|---|---|---|
| 3,561,831 | 2/1971 | Alibert et al. | 310/338 |
| 3,603,152 | 9/1971 | Alibert et al. | 310/338 X |
| 3,942,049 | 3/1976 | Hyanova et al. | 310/338 |
| 4,146,875 | 3/1979 | Beatson | 310/338 X |
| 4,192,179 | 3/1980 | Yelke | 73/119 A |
| 4,214,484 | 7/1980 | Abts | 310/338 X |
| 4,217,781 | 8/1980 | Abts | 310/338 X |
| 4,391,147 | 7/1983 | Krempl et al. | 310/338 X |
| 4,404,854 | 9/1983 | Krempl et al. | 73/730 |

Primary Examiner—Mark O. Budd
Attorney, Agent, or Firm—Chilton, Alix & Van Kirk

[57] ABSTRACT

A piezoelectric sensor adapted for incorporation into a high pressure fuel line employs a pair of piezoelectric transducer elements which are mounted in diametrically opposed bores of a main body. The body forms an axially extending fluid conduit. The main body also has a deformable wall section adjacent the transducer elements. A conductor ring extends the circumference of the main body. The transducer elements electrically connect with the ring so that a pressure pulse traversing the conduit deforms the wall section and produces a mechanical stress on the transducer elements to generate a voltage signal at the conductor ring.

15 Claims, 2 Drawing Sheets

PIEZOELECTRIC SENSOR

BACKGROUND OF THE INVENTION

The present invention relates generally to piezoelectric sensors of the type employed for sensing a transient or momentary mechanical displacement, deformation or strain and generating a corresponding output signal. More particularly, the present invention relates to piezoelectric sensors having notable utility in connection with an internal combustion engine fuel injection system for generating a reference fuel injection timing signal.

A number of devices and methods have been advanced for sensing a pressure pulse in a conduit, such as a fuel line, by means of a piezoelectric transducer. For example, Beatson et al U.S. Pat. No. 4,146,875 discloses a pressure sensing device wherein an electrical transducer is mounted upon a flexing portion of a ring which surrounds a body subjected to internal pressure. One application of the device clamps around an engine fuel line to sense fuel pressure. In Beatson et al U.S. Pat. No. 4,257,260, an engine analyzing apparatus senses pressure in fuel lines by means of piezoelectric crystals symmetrically located at opposing positions of a fuel line. The transducers generate electric signals in response to a bending stress caused by periodic dilation of the pipe resulting from pressure pulses within the pipe. Beatson et al British Patent No. 1,389,408 discloses a pair of pressure sensing elements such as transducers which convert a mechanical load pressure within a fuel line pipe to an electrical signal.

Wessel U.S. Pat. No. 4,430,899 discloses a fluid pressure sensor employed in conjunction with a diesel engine injection pump wherein a strain bolt is tapped into a bore extending through a housing wall. The bolt has a bore which extends therethrough and a region of reduced outer diameter which forms a thin wall tubular sleeve-like region. Two oppositely polarized piezoelectric transducer discs are clamped between the outer wall of the housing so that upon application of a fluid pressure and resultant straining of the thin wall portion of the bolt, an output signal is generated.

Claassen et al U.S. Pat. No. 4,194,401 discloses a transducer for measuring the internal pressure in injection pipes of diesel engines. A rigid housing encloses the injection pipe and at least one elastic sensor is arranged inside the housing adjacent to a portion of the circumference of the pipe. An endorsing element elastically forces the sensor element against the pipe whereby deformations of the pipe are transmitted frictionally to the sensor element for generating an electrical signal indicative of the pressure induced strain on the pipe.

Russell U.S. Pat. No. 3,898,885 discloses a fluid pressure transducer wherein transducer sensing numbers are mounted on arms which ae pivotally mounted to permit engagement of the sensing members with a pipe. The arms have frictional engagement with a pair of plates to provide damping of the movement of the members due to variations of the diameter of the pipe.

Yelke U.S. Pat. No. 4,304,126 also discloses a transducer for sensing and monitoring the injection of fuel into a fuel injection type engine. The transducer comprises a flexible collar and a flexible piezoelectric element mounted on the fuel line to sense the change in the circumferential dimension of the line due to the pressure pulse created as fuel is injected through the line into the engine.

SUMMARY OF THE INVENTION

The present invention is a new and improved piezoelectric sensor particularly adapted for use in internal combustion engine fuel injection systems. The piezoelectric sensor is adapted for mounting in a high pressure fuel line leading to a fuel injection nozzle for generating a reference timing signal of a fuel injection event. The piezoelectric sensor is especially useful for operating with a timing light or magnet pickup in desired synchronized relationship with a fuel injection event.

Briefly stated, the invention in a preferred form is a piezoelectric sensor for sensing a fluid pressure pulse. The sensor comprises a main body which forms an axially extending conduit for conducting a fluid pressure pulse therethrough. The main body has a wall section which is deformable upon a fluid pressure pulse traversing the conduit. A pair of diametrically opposed bores having end surfaces which are at least partially defined by the wall section are formed in the main body. A pair of piezoeleotric elements are mounted in fixed position in the bores. Each element has a pair of opposed faces and is operable to generate a piezoelectric voltage signal between the faces by varying the stress applied therethrough. A conductor ring is spaced from the elements and extends circumferentially around the main body. A pair of wires connect between the elements and the ring to provide electrical communication therebetween so that the fluid pressure pulse traversing the conduit deforms the wall section and produces a mechanical stress on the elements to generate a voltage signal for electrical communication at the conductor ring.

The conductor ring further includes a pair of diametrically opposed tabs. The wires are frictionally engaged between the tabs and adjacent portions of the ring. The main body further comprises axially spaced first and second connectors which provide a high pressure connection with the main body to provide fluid communication through the conduit. A potting material substantially occupies the space defined by the bores between the main body and the ring and embeds the wires. The piezoelectric elements have a thin disc-like shape with opposing parallel faces of opposite polarity. The positive face of each element is bonded to an end surface of the main body bore. An insulator collar is generally coaxial with the ring and is disposed between the conductor ring and the main body to electrically isolate the ring from the main body. The collar forms a pair of diametrically opposed openings which receive the tabs of the conductor ring.

An object of the invention is to provide a new and improved piezoelectric sensor for a diesel type fuel injection system.

Another object of the invention is to provide a new and improved piezoelectric sensor which is readily adapted for connecting in a high pressure fuel line for generating an electric signal in response to a momentary hydraulic pressure pulse within the fuel line.

A further object of the invention is to provide a new and improved piezoelectric sensor having an efficient construction for sensing a momentary or transient hydraulic pressure increase or decrease by sensing the accompanying expansion and/or contraction of a hydraulic fluid conduit.

A yet further object of the invention is to provide a new and improved piezoelectric sensor which employs a pair of opposed transducer crystals to generate a primary piezoelectric signal without generating significant noise in response to the mechanical vibration of the piezoelectric transducers.

Other objects and advantages will become apparent from the specification and the drawings.

DETAILED DESCRIPTION OF THE INVENTION

Figure 1:
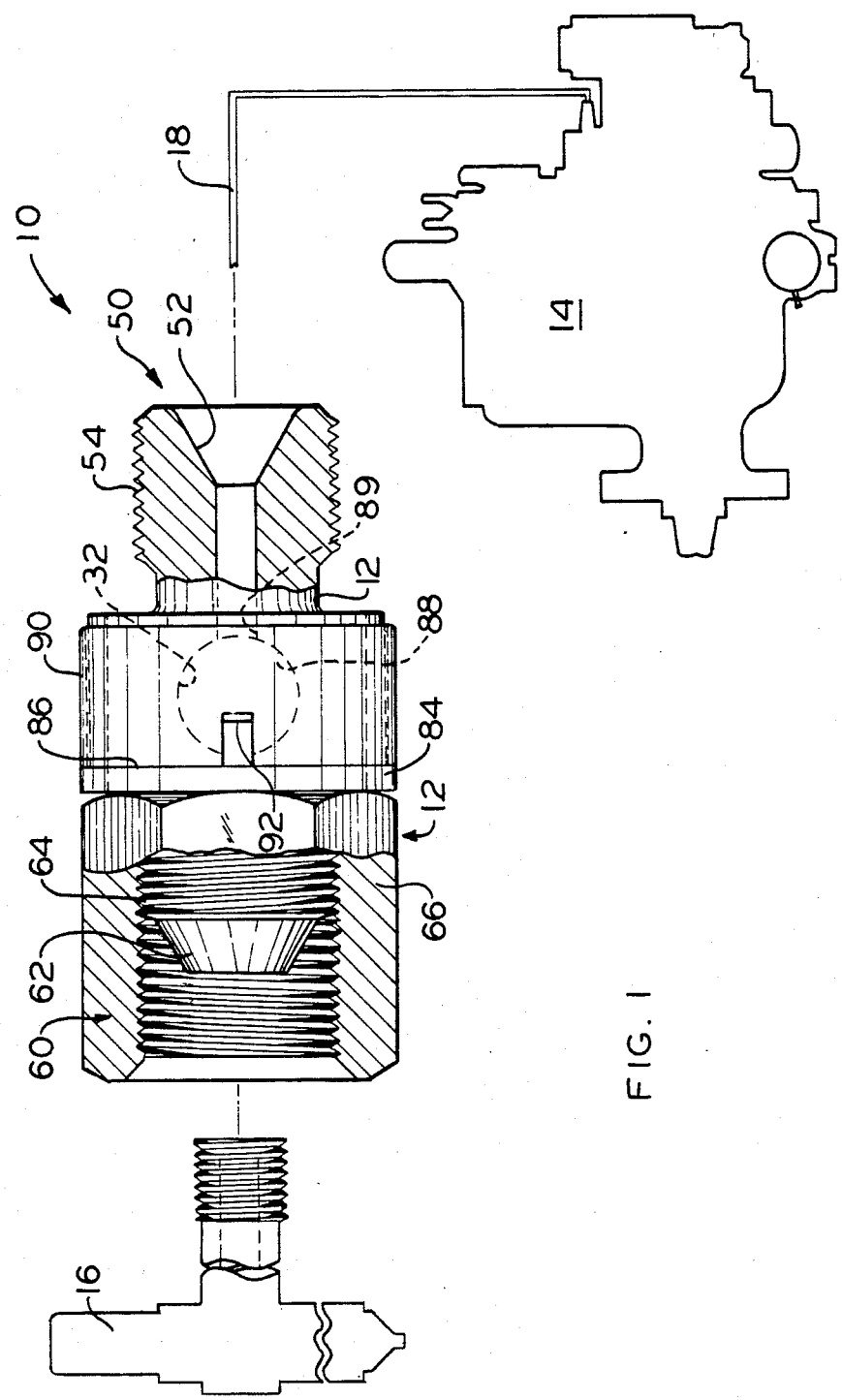
FIG. 1 is a partial schematic view and a partial side elevational view, partly broken away and partly in section, of a fuel injection system which incorporates a preferred embodiment of a piezoelectric sensor of the present invention.

With reference to the drawings wherein like numerals represent similar or like parts throughout the figures, a fuel injection system 10 incorporating a piezoelectric sensor 12 of the present invention is schematically illustrated in FIG. 1. The fuel injection system 10 comprises a diesel type fuel injection pump 14 of conventional form. The fuel injection pump is driven by an associated internal combustion engine (not illustrated). An injection nozzle 16 is associated with each cylinder of the internal combustion engine. In a well known manner, the fuel injection pump 14 is driven by the associated internal combustion engine to periodically supply high pressure pulses of fuel to each fuel injection nozzle 16 of the engine for injection of discrete charges of fuel into respective engine cylinders in synchronism with the engine. The fuel injection pump 14 connects each nozzle 16 by means of a separate high pressure fuel line 18.

For the illustrated application, each such fuel injection pulse has a relatively short duration and a maximum pressure of up to 10,000 p.s.i. or more. The duration and the pressure of the pulse is primarily dependent on the design of the fuel injection system 10 and the engine speed and load. By way of example, the fuel injection pump 14 may be of the type disclosed in U.S. Pat. No. 4,224,916 of Charles W. Davis entitled "Timing Control For Fuel Injection Pump" and assigned to the assignee of the present invention. Nozzle 16 may be of a form such as disclosed in U.S. Pat. No. 4,163,521 of Vernon D. Roosa entitled "Fuel Injector" and assigned to the assignee of the present invention.

The piezoelectric sensor 12 generates reference fuel injection timing signals which are employed in conjunction with, for example, the crank shaft reference position signals to adjust the fuel injection timing. The actual fuel injection timing may be calculated with reference to the top dead center (TDC) position of the engine crank shaft for the engine cylinder for which the piezoelectric sensor 12 is associated. While the piezoelectric sensor 12 is preferably employed to generate a signal in concert with a reference piston position, it should be appreciated that the sensor may have application with numerous other signals. For example, the sensor may form part of a feedback loop to a control unit (not illustrated) for automatically adjusting the timing of a fuel injection pump. It should also of course be appreciated that the piezoelectric sensor has applications other than in conjunction with a fuel injection system which is the preferred operational environment of the sensor.

Figure 2:
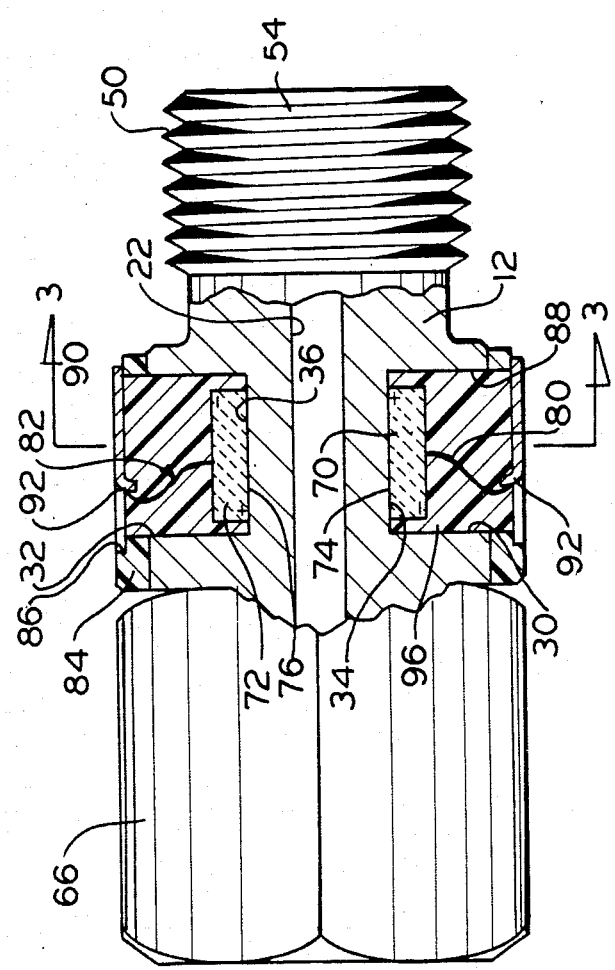
FIG. 2 is an enlarged top axial sectional view, partly broken away and partly in section, of the piezoelectric sensor of FIG. 1.
Figure 3:
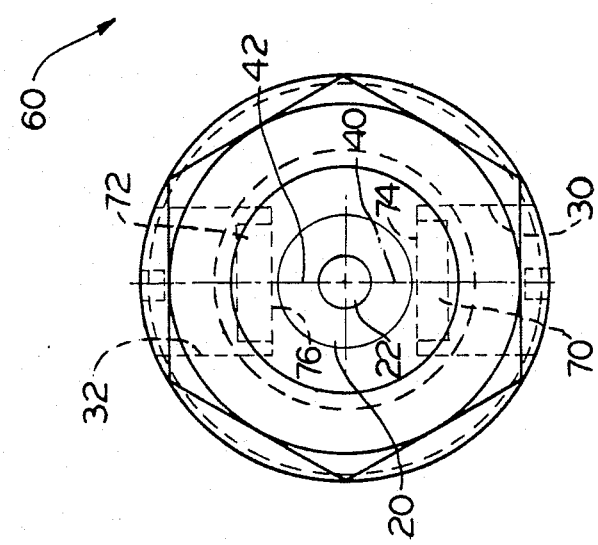
FIG. 3 is a sectional view of the piezoelectric sensor of FIG. 2 taken along the line 3—3 thereof.

With additional reference to FIGS. 2 and 3, the piezoelectric sensor 12 has an elongated main body 20 which is constructed of a high grade steel. The metal body 20 forms a central axial fuel passageway or bore 22. The fuel passageway 22 communicates with the high pressure fuel line 18 to conduct each high pressure fuel injection pulse to the nozzle 16. In one preferred embodiment, the passageway 22 has a diameter of approximately 0.09 inches. The intermediate axial portions of the main body 20 are configured to form a sensor mounting portion which includes a pair of aligned diametrically opposed radial bores 30 and 32 having parallel flat end faces 34 and 36, respectively.

A pair of substantially identical opposed integral wall or web sections 40 and 42 of the main body are formed between central axial portions of fuel passageway 22 and the inner flat end surfaces 34 and 36 of the diametrically opposed radial bores 30 and 32. The wall or web sections 40 and 42 have, for example, a minimum diametral thickness of approximately 0.08 inches. The wall portions 40 and 42 have curved internal surfaces which define in part the intermediate axial portion of the central axial fuel passageway 22. The wall portions 40 and 42 are adapted to be momentarily deformed or flexed slightly radially outwardly substantially simultaneously with each momentary high pressure fuel injection pulse which traverses through the fuel conduit 22 for delivery to the nozzle 16.

A pair of axially spaced high pressure connectors 50 and 60 are provided at each end of the main body 20 to provide a high pressure fluid connection with the high pressure fuel line and/or a nozzle. High pressure connector 50 is a female connector having a conical seat 52 which axially converges toward the opening to the fuel passageway 22. The conical seat 52 is adapted to mate with a complementary fitting of a high pressure conduit. A threaded surface 54 extends circumferentially at an end surface portion of the main body and generally coaxially with the conical seat. Surface 54 receives a coupling nut (not illustrated) which couples with the fitting of the high pressure conduit 18 to provide the high pressure connection.

High pressure connector 60 is a male connector comprising an axially protruding truncated conical extension 62 which is adapted for coupling engagement with a complementary female connector fitting (not illustrated). A threaded surface 64 extends circumferentially of the main body for threadably receiving a coupling nut 66 to complete the high pressure connection.

Circular, flat disc-like or wafer-like piezoelectric transducers 70 and 72 are mounted in respective diametrically opposed bores 30 and 32, respectively. The transducer elements 70 and 72 have respective faces 74 and 76 which directly engage the inner surfaces 34 and 36, respectively. In one embodiment, the transducer elements are piezoelectric crystals having a diameter of approximately 0.205 inches and a uniform thickness of approximately 0.05 inches. The crystals are bonded to the main body by an epoxy. The two piezoelectric transducers 70 and 72 are preferably substantially identical and have aligned coaxial polarities which are normal to the parallel crystal end faces 74 and 76 and thus normal to the axis of the intermediate fuel passageway 22. Preferably, the transducers are mounted so that the positive side is bonded to the main body at surfaces 34 and 36 and the negative side is opposite the respective end surfaces 34 and 36. The transducer elements are coaxially centrally positioned within the respective mounting bores and are generally in diametral alignment.

A pair of wires 80 and 82 each of which may be of single strand No. 32 gage are soldered at one end to each of the crystals. An insulator collar 84 of generally cylindrical form having a circumferential flange 86 at one end (the downstream end as illustrated) is closely received by an intermediate outer cylindrical portion of the main body. The collar 86 has a pair of diametrically opposed circular openings 88 which are formed in the cylindrical surface. The openings are generally dimensioned to have the same diameter as bores 30 and 32. Slots 89 axially extend from openings 88 to the second (upstream) end of the collar. The collar 84 is preferably formed from nylon or other electrically insulating material.

A brass conductor ring 90 has an inside diameter which is commensurate with the outside diameter of the insulator collar 84 to permit a close slidable engagement therewith. The conductor ring 90 has a generally uniform axial length and includes a pair of diametrically opposed tabs 92 which are punched out of the ring body and bent inwardly. The conductor ring is closely received on the insulator collar with the tabs extending obliguely into the openings 88. Each of the wires 80 and 82 is pulled through an interference fit-type intersection formed between the tab 92 and adjacent portions of the conductor ring 90 and soldered in place. The flange 86 functions to axially locate a reference (downstream) edge of the conductor ring.

After the wires 80 and 82 are soldered in place to the conductor ring 90, a potting material 96 such as Mereco No. 303LV is injected through the slots 89. The potting material 96 fills the cavities formed in each of the bores 30 and 32, to thereby embed the wires and the transducers in position. The potting material substantially fills the spaces between the inside surface of the conductor ring 90 and the transducer elements 70 and 72.

It will be appreciated that the foregoing described piezoelectric sensor may be assembled by a very efficient construction process including an efficient means for mounting the transducer elements and their respective leads to the main body. In accordance with a principal feature of the invention, the conductor ring 90 extends circumferentially of the main body and essentially functions as a universally connectable connector. Angular orientation of the piezoelectric sensor is not critical to implementing external electrical communication with the conductor ring. External electrical connection with the conductor ring 90 may be provided by numerous conventional means.

As illustrated, the two transducer elements 70 and 72 are connected in parallel electrical connection with the metal main body electrically connecting the positive surfaces 74 and 76 and the negative surfaces of the crystals electrically connecting via the conductor ring 90. The conductor ring 90 functions as an output electrical terminal for remotely transmitting an electrical signal.

It will be appreciated that for the described sensor configuration, transducer elements 70 and 72 generate correspondingly substantially simultaneous and identical primary voltage signals in response to the traversal of a hydraulic high pressure pulse through the high pressure passageway 22. The primary signal is ordinarily followed by corresponding generally simultaneous identical voltage noise signals which result from mechanical vibration of the main body caused by the momentary high pressure hydraulic pulse. The noise signals, however, are substantially 180° out of phase and combine to substantially attenuate and cancel each other out by virtue of the voltages being substantially opposite.

As a fuel injection pulse is conducted through the sensor portions of the piezoelectric sensor (at a velocity equal to the sonic velocity of fuel), the two opposed wall portions 40 and 42 are momentarily and substantially simultaneously deformed radially outwardly to substantially simultaneously and equally stress the two piezoelectric crystals 70 and 72. The stress essentially comprises an initial compression and then a reactive decompression of the piezoelectric crystals 70 and 72. The crystal strain produced by the compression and decompression of each of the crystals generates a momentary voltage signal or spike. The two signals are substantially simultaneously equal and combine to produce an enhanced reference fuel injection timing signal.

The vibration produced noise signal trains which are generated by each of the transducers 70 and 72 are approximately 180° out of phase in relationship to the primary signals due to the fact that the wall portions 40 and 42 vibrate in synchronism in the same direction subsequent to the primary radial deformation of the wall portions. By comparison the wall portions deform in the opposite direction when the wall portions are deformed by the primary momentary or transient hydraulic pressure increase and decrease.

It will be appreciated that although the described embodiment is illustrated in its preferred environment in a fuel injection system, a piezoelectric sensor 12 in accordance with the present invention may also be employed for sensing a momentary or transient pressure change in a high pressure hydraulic system or could be similarly employed with a pneumatic system or relatively low pressure fluid system such as with a low pressure chamber of a fuel injection system. The sensor could also be suitably connected to the advanced piston chamber of the fuel injection pump and employed to generate a reference fuel injection timing signal in response to a hydraulic pulse reaction to the actuation of the fuel charge pump.

It can be seen from the foregoing description that the present invention provides a method and a device wherein a piezoelectric sensor may be efficiently mounted in a high pressure fuel line to generate a reference voltage signal in response to the momentary or transient fluid pressure charge.

While a preferred embodiment of the foregoing invention has been set forth for purposes of illustration, the foregoing description should not be deemed a limitation of the invention herein. Accordingly, various modifications, adaptations and alternatives may occur to one skilled in the art without departing from the spirit and the scope of the present invention.

What is claimed:

1. A piezoelectric sensor for sensing a fluid pressure pulse comprising:
   body means for forming an axially extending conduit for conducting a fluid pressure pulse therethrough, said body means having a wall section which is deformable by a said fluid pressure pulse traversing said conduit said body means defining a pair of diametrically opposed bores having end surfaces which are at least partially defined by said wall section;

first and second piezoelectric elements mounted in fixed position in said bores, each said element having a pair of opposed faces and being operable to generate a piezoelectric voltage signal between the faces by varying the stress applied thereto;

a conductor ring spaced from said elements and extending circumferentially around said body means; and conductor means to provide electrical communication between each said element and said ring, so that a fluid pressure pulse traversing said conduit deforms the wall section and produces a mechanical stress on said elements to generate a signal for electrical communication at said conductor ring.

2. The piezoelectric sensor of claim 1 wherein said conductor ring further includes a pair of diametrically opposed tabs and said conductor means include a pair of wires which are frictionally engaged between said tabs and adjacent portions of said ring.

3. The piezoelectric sensor of claim 1 further comprising axially spaced first and second connector means for implementing a high pressure connection with said body means to provide fluid communication through said conduit.

4. The piezoelectric sensor of claim 1 further comprising a potting material substantially occupying the space defined by said bores between said body means and said ring and embedding said conductor means.

5. The piezoelectric sensor of claim 1 wherein said piezoelectric elements have a thin disc-like shape.

6. The piezoelectric sensor of claim 5 wherein each said element has opposed parallel faces of opposite polarity, the positive face of each element being bonded to an end surface.

7. The piezoelectric sensor of claim 1 further comprising an insulator collar generally coaxial with said ring and disposed between said conductor ring and said body means to electrically isolate said ring and said body means.

8. The piezoelectric sensor of claim 2 further comprising an insulator collar generally coaxial with said ring and disposed between said ring and body means, said collar forming a pair of diametrically opposed openings which receive said tabs.

9. A piezoelectric sensor for sensing a fluid pressure pulse comprising:

body means for forming an axially extending conduit for conducting a fluid pressure pulse therethrough, said body means having a wall section which is deformable by a said fluid pressure pulse traversing said conduit, said body means defining a pair of diametrically opposed bores having end surfaces which are at least partially defined by said wall section, said body means having axially spaced high pressure connector means for receiving connector fittings for providing high pressure fluid communication between said conduit and a high pressure line;

first and second piezoelectric elements mounted in fixed position in said bores, each said element having a pair of opposed faces and being operable to generate a piezoelectric voltage signal between the faces by varying the stress applied thereto;

a conductor ring spaced from said elements and extending circumferentially around said body means; and conductor means to provide electrical communication between each said element and said ring, so that a fluid pressure pulse traversing said conduit deforms the wall section and produces a mechanical stress on said elements to generate a voltage signal for electrical communication at said conductor ring.

10. The piezoelectric sensor of claim 9 wherein said conductor ring further includes a pair of diametrically opposed tabs and said conductor means includes a pair of wires which are frictionally engaged between said tabs and adjacent portions of said ring.

11. The piezoelectric sensor of claim 10 further comprising an insulator collar generally coaxial with said ring and disposed between said ring and body means, said collar forming a pair of diametrically opposed slots which receive said tabs.

12. A piezoelectric sensor for sensing a fluid pressure pulse comprising:

body means for forming an axially extending conduit for conducting a fluid pressure pulse therethrough, said body means having a wall section which is deformable by a said fluid pressure pulse traversing said conduit, and defining a pair of diametrically opposed bores having end surfaces which are at least partially defined by said wall section;

first and second piezoelectric transducer means comprising wafer-like crystals mounted in fixed position in said bores, each said crystal having a pair of opposed faces with one said face engaging an end surface, said transducer means being operable to generate a piezoelectric voltage signal between the faces by varying the stress applied thereto;

a conductor ring spaced from said crystals and extending circumferentially around said body means, a pair of diametrically opposed tabs extending from said ring; and conductor means connecting said tabs to provide electrical communication between each said crystal and said ring, so that a fluid pressure pulse traversing said conduit deforms the wall section and produces a mechanical stress on said elements to generate a signal for electrical communication at said conductor ring.

13. The piezoelectric sensor of claim 12 wherein each said crystal has opposed parallel faces of opposite polarity, the positive face of each crystal being bonded to an end surface.

14. The piezoelectric sensor of claim 12 further comprising an insulator collar generally coaxial with said ring and disposed between said conductor ring and said body means to electrically isolate said ring from said body means, said collar forming a pair of diametrically opposed openings which receive said tabs.

15. The piezoelectric sensor of claim 12 further comprising a potting material substantially occupying the space defined by said bores between said body means and said ring and embedding said conductor means.

* * * * *